United States Patent [19]

Rifi

[11] Patent Number: 4,717,753

[45] Date of Patent: Jan. 5, 1988

[54] CHLOROSULFONATED ALKYLENE-ALKYL ACRYLATE COPOLYMERS

[75] Inventor: Mahmoud R. Rifi, Kendall Park, N.J.

[73] Assignee: Union Carbide Corporation, Danbury, Conn.

[21] Appl. No.: 853,371

[22] Filed: Apr. 15, 1986

Related U.S. Application Data

[63] Continuation of Ser. No. 680,568, Dec. 11, 1984, abandoned, which is a continuation-in-part of Ser. No. 514,336, Jul. 15, 1983, abandoned.

[51] Int. Cl.$^4$ .................................................. C08F 8/38
[52] U.S. Cl. ................................... 525/330.4; 525/344
[58] Field of Search ........................................ 525/330.4

[56] References Cited

U.S. PATENT DOCUMENTS

| | | | |
|---|---|---|---|
| 2,405,971 | 8/1946 | McAlevy | 525/330.4 |
| 2,778,813 | 1/1957 | Gaspar | 525/344 |
| 2,890,213 | 6/1959 | Noeske | 525/344 |
| 3,347,835 | 10/1967 | Lorenz | 525/344 |
| 3,624,054 | 11/1971 | Barton et al. | 525/344 |
| 3,770,706 | 11/1973 | Walles | 525/344 |
| 4,011,379 | 3/1977 | Bow et al. | 525/344 |
| 4,144,289 | 3/1979 | Watanabe et al. | 525/227 |
| 4,220,739 | 9/1980 | Walles | 525/344 |

FOREIGN PATENT DOCUMENTS

| | | |
|---|---|---|
| 111832 | 7/1983 | Japan . |
| 49207 | 3/1984 | Japan . |
| 1385778 | 2/1975 | United Kingdom . |

OTHER PUBLICATIONS

Hypalon, Dupont Bulletin, HP-310.1.

*Primary Examiner*—Christopher Henderson
*Attorney, Agent, or Firm*—Saul R. Bresch

[57] ABSTRACT

Chlorosulfonated alkylene-alkyl acrylate copolymers prepared by reacting, in the absence of a solvent or diluent, a granular alkylene-alkyl acrylate copolymer with a gaseous chlorosulfonating agent. The granular, elastomeric chlorosulfonated alkylene-alkyl acrylate copolymers can be used as extrudates about wires and cables and can be formed into film material characterized by excellent optical properties.

7 Claims, No Drawings

CHLOROSULFONATED ALKYLENE-ALKYL ACRYLATE COPOLYMERS

This application is a continuation of application Ser. No. 680,568 filed Dec. 11, 1984, now abandoned, which in turn is continuation-in-part of copending application Ser. No. 514,336, filed July 15, 1983 now abandoned.

SUMMARY OF THE INVENTION

This invention relates to chlorosulfonated alkylene-alkyl acrylate copolymers prepared by reacting, in the absence of a solvent or diluent, a granular alkylene-alkyl acrylate copolymer with a gaseous chlorosulfonating agent. The granular, elastomeric chlorosulfonated alkylene-alkyl acrylate copolymers so produced have a tensile modulus of less than about 2000 psi, a crystallinity of less than about 10 percent and are particularly useful as flame retardant extrudates about wires and cables and as film material characterized by excellent optical properties.

BACKGROUND OF THE INVENTION

Alkylene-alkyl acrylate copolymers are known copolymers which are characterized by an excellent balance of properties such as relatively high tensile strength, resistance to moisture and resistance to common solvents and diluents. By reason of their excellent balance of properties, alkylene-alkyl acrylate copolymers have been used in many diverse applications including jacketing and insulation about wires and cables and as film to be used as packaging material. A serious drawback to the even wider acceptance of alkylene-alkyl acrylate copolymers in the areas of use described has been the poor flammability characteristics of the copolymers and the poor optical properties of film material prepared from these polymers. It has been necessary, with respect to the flammability problem, to compound these polymers with various flame retardant additives such as antimony oxide and chlorinated paraffins. The additional compounding step not only adds to the overall cost of the compositions but, in the case of chlorinated paraffins which contain labile chlorine, chlorine splits off as HCl which can degrade compounded compositions.

DETAILED DESCRIPTION OF THE INVENTION

The present invention provides chlorosulfonated alkylene-alkyl acrylate copolymers which, by their chemical structure, have a built-in flame retardant capability. Consequently, the chlorosulfonated alkylene-alkyl acrylate copolymers of this invention do not require the addition thereto of flame retardant additives. Furthermore, the copolymers can be formed into film material, by the conventional bubble technique, which is characterized by excellent optical properties. The chlorosulfonated alkylene-alkyl acrylate copolymers of this invention, therefore, are especially useful as flame retardant extrudates about wires and cables as clear film for packaging.

The polymers of this invention are prepared by reacting, in the absence of a solvent or a diluent, a granular, alkylene-alkyl acrylate copolymer with a gaseous chlorosulfonating agent to produce a granular, elastomeric, chlorosulfonated alkylene-alkyl acrylate copolymer having a tensile modulus of less than about 2,000 psi and a crystallinity of less than about 10 percent, preferably a crystallinity of 0 to about 5 percent. These polymers generally have a total chlorine content of about 5 to about 55 percent by weight, preferably about 15 to about 40 percent by weight and generally have a sulfur content of about 0.1 to about 10 percent by weight, preferably about 0.5 to about 5 percent by weight.

The reaction depicting the chlorosulfonation reaction wherein chlorine and SO$_2$Cl groups replace hydrogen atoms of the polymer backbone is set forth below.

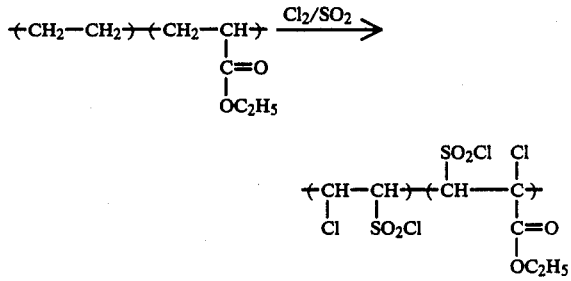

The chlorosulfonated polymers, prepared as shown by the reaction scheme above, are flexible, flame retardant polymers which can be formed into clear film; and are different in character from conventional chlorosulfonated ester polymers produced according to the process disclosed in U.S. Pat. No. 2,778,812.

The reaction scheme, involving the preparation of chlorosulfonated ester polymers according to U.S. Pat. No. 2,778,812, can be depicted as follows:

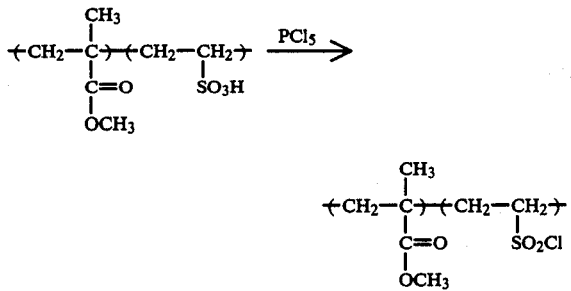

These polymers (U.S. Pat. No. 2,778,812) are brittle and flammable.

The alkylene-alkyl acrylate copolymers which are chlorosulfonated in accordance with this invention are known polymers produced by reacting an alkene or mixtures thereof with an alkyl acrylate or mixtures thereof.

Suitable alkenes are ethylene, propylene, butene-1, isobutylene, pentene-1, 2-methylbutene-1, 3-methylbutene-1, hexene-1, heptene-1, octene-1, and the like.

The alkylene moiety of the alkylene-alkyl acrylate copolymer generally contains from 2 to 18 carbon atoms inclusive, preferably 2 to 3 carbon atoms inclusive.

Suitable alkyl acrylate monomers which are copolymerized with the alkenes fall within the scope of the following formula:

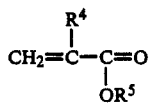

wherein $R^4$ is hydrogen or methyl and $R^5$ is alkyl having one to 8 carbon atoms inclusive. Illustrative compounds encompassed by this formula are: methyl acrylate, ethyl acrylate, t-butyl acrylate, methyl methacrylate, n-butyl acrylate, n-butylmethacrylate, 2-ethylhexyl acrylate and the like.

Alkylene-alkyl acrylate copolymers generally have a density (ASTM D-1505 with conditioning as in ASTM D-147-72) of about 0.92 to about 0.94 and a melt index (ASTM D-1238 of 44 psi tested pressure) of about 0.5 to about 500 decigrams per minute and are formed by reacting about 50 to 99 and preferably about 80 to 98 percent by weight alkene, preferably ethylene and about 1 to 50 and preferably 2 to 20 percent by weight combined alkyl acryalte.

For purposes of the present invention, the preferred copolymer is an alkylene-alkyl acrylate copolymer generally a copolymer of ethylene-ethyl acrylate, having about one to about 50 percent by weight combined alkyl acrylate, preferably having about 2 to about 20 percent by weight combined alkyl acrylate.

The actual time of treatment generally varies from about 3 to about 10 hours, depending upon the particular polymer being chlorosulfonated, the chlorosulfonating agent being used and the temperature and pressure being employed.

Generally, suitable temperatures are in the range of about 50° C. to about 130° C., preferably about 50° C. to about 100° C. The pressure under which the reaction is conducted can range from atmospheric pressure to a pressure of about 1,000 psi, provided that none of the reactants or by-products condense under the reaction conditions employed. As a rule, the higher the temperature and pressure, the shorter the reaction time.

In carrying out the reaction, the amount of chlorosulfonating agent used, e.g. a mixture of sulfur dioxide and chlorine, is about 10 to about 200 percent by weight, preferably about 20 to about 100 percent by weight based on the weight of the polymer being treated. In those instances wherein a mixture of $SO_2$ and $Cl_2$ is used as the reactant or modifying agent, the mole ratio of $Cl_2$ to $SO_2$ is about 5:1 to 10:1, preferably about 5:1.

If desired, an inert gas such as nitrogen may be used in conjunction with the gaseous modifying agents, serving as a fluidizing agent, a diffusion aid and/or as a heat sink.

The properties noted herein were determined by the following test methods:

| | |
|---|---|
| Crystallinity (percent) | Measured by Differential Scanning Calorimeter (DSC) using a duPont-990 analyzer with a pressure DSC cell. |
| Tensile Modulus (psi) | A film, 4 inches by 4 inches by 0.020 inch, was compression molded at a temperature of 130° C.–150° C. and its one percent secant modulus measured according to ASTM-D-638. |
| Tensile Strength (psi) | A film prepared as described for the Tensile Modulus test, was tested according to ASTM-D-638. |
| Percent Elongation at Break | A film, prepared as described for the Tensile Modulus test, was tested according to ASTM-D-638. |

Also, the term "granular" is intended to encompass alkylene-alkyl acrylate copolymers which generally have a particle size of about 150 to 1000 microns, and an average particle size of about 300 to 800 microns.

In the following Examples, which are illustrative of the present invention, the ethylene ethyl acrylate copolymers were chlorosulfonated in a two liter glass-lined stainless steel or Hastelloy (55Ni, 17Mo, 16Cr, 6Fe, 4W) reactor equipped with a thermocouple thermometer and a motor activated U-shaped Hastelloy stirrer.

A Hastelloy dip tube (~2 cm in diameter) was used to feed the gaseous modifying agent(s) into the reactor. Unreacted modifying agent and HCl were vented to a collection trap containing 25 percent aqueous NaOH. The gaseous modifying agents were fed at the rate of 10 to 12 grams $Cl_2$ per hour and 2–3 g $SO_2$/hour under a pressure of about 15 to 450 psi. The polymer to be treated, about 100 to 200 grams, was charged to the reactor and heated therein by an external heater. No catalysts were used in any of these experiments.

After the polymer was added to the reactor and heated to the desired reaction temperature the resin was agitated by the stirrer and the gaseous modifying agent was fed in. During the course of the reaction, samples of the modified polymer were taken from the reactor to test for S and Cl content, and percent crystallinity. When the modification process has proceeded to the point where the crystallinity of the polymer had reached less than about 10 percent, the flow of gaseous modifying agent was terminated and the product was allowed to cool in the reactor while being purged with nitrogen to remove $SO_2$, $Cl_2$ and HCl.

Five separate runs were conducted using an ethylene-ethyl acrylate copolymer containing 18 percent by weight ethyl acrylate and having an average particle size of about 500 microns.

Properties of the unmodified ethylene-ethyl acrylate copolymer and the chlorosulfonated ethylene-ethyl acrylate copolymers are set forth in Table 1.

TABLE 1

| | Properties of Chlorosulfonated EEA | | | | | |
|---|---|---|---|---|---|---|
| | Starting | Final Product | | | | |
| Resin: | Material | 1 | 2 | 3 | 4 | 5 |
| Properties: | | | | | | |
| Cl, percent | 0 | 16 | 24 | 28 | 29 | 30 |
| S, percent | 0 | 0.85 | 0.45 | 0.15 | 0.9 | 2.2 |
| Crystallinity, percent | 32 | 6 | <10 | 5.4 | 3 | 5 |
| Tensile Modulus at ~25° C., psi | 5,560 | 1,810 | 1,350 | 1,100 | 885 | 900 |
| Tensile Strength, psi | 2,300 | 1,360 | 1,300 | 830 | 850 | 1,210 |
| Elongation, percent | 919 | 742 | 660 | 340 | 527 | 494 |

What is claimed is:

1. A granular, elastomeric, flame retardant chorosulfonated alkylene-alkyl acrylate copolymer having a tensile modulus of less than about 2,000 psi and a crystallinity of less than about 10 percent, prepared by reacting an alkylene-alkyl acrylate copolymer with a gaseous chlorosulfonating agent in the absence of solvent or diluent wherein the copolymer has about one to about 50 percent by weight combined alkyl acrylate; a total chlorine content of about 5 to about 55 percent by weight; and a sulfur content of about 0.1 to about 10 percent by weight.

2. A granular, elastomeric, flame retardant alkylene-alkyl acrylate copolymer as defined in claim 1 wherein the gaseous chlorosulfonating agent is a combination of sulfur dioxide and chlorine.

3. A granular, elastomeric, flame retardant chlorosulfonated alkylene-alkyl acrylate copolymer as defined in claim 1 wherein the alkylene-alkyl acrylate copolymer has about 2 to about 20 percent by weight combined alkyl acrylate.

4. A granular, elastomeric, flame retardant chlorosulfonated alkylene-alkyl acrylate copolymer as defined in claim 1 wherein the alkylene-alkyl acrylate copolymer is an ethylene-ethyl acrylate copolymer.

5. A granular, elastomeric, flame retardant alkylene-alkyl acrylate copolymer as defined in claim 1 having a crystallinity of 0 to about 5 percent.

6. A granular, elastomeric, flame retardant alkylene-alkyl acrylate copolymer as defined in claim 1 having a total chlorine content of about 15 to about 40 percent by weight and a sulfur content of about 0.5 to about 5 percent by weight.

7. A granular, elastomeric, flame retardant alkylene-alkyl acrylate copolymer as defined in claim 6 wherein the alkylene-alkyl acrylate copolymer is an ethylene-ethyl acrylate copolymer.

* * * * *